(12) United States Patent
O'Leary et al.

(10) Patent No.: US 8,301,355 B2
(45) Date of Patent: Oct. 30, 2012

(54) CRUISE CONTROL SYSTEMS AND METHODS WITH SELECTIVE TARGET SPEED UPDATING FOR PASSING MANEUVERS

(75) Inventors: Patrick J. O'Leary, Clinton Township, MI (US); Barbara A. Shuler, Brighton, MI (US)

(73) Assignee: GM Global Technology Operations LLC

( * ) Notice: Subject to any disclaimer, the term of this patent is extended or adjusted under 35 U.S.C. 154(b) by 426 days.

(21) Appl. No.: 12/470,044

(22) Filed: May 21, 2009

(65) Prior Publication Data

US 2010/0299041 A1    Nov. 25, 2010

(51) Int. Cl.
*B60T 8/32* (2006.01)
(52) U.S. Cl. ............ 701/93; 701/96; 701/301; 701/117; 340/903; 340/435; 340/436; 180/169; 180/170; 180/178; 180/179; 180/422

(58) Field of Classification Search .................... 701/93, 701/96, 301, 1, 117; 340/903, 435–6; 180/169–170, 180/178–179, 422
See application file for complete search history.

(56) References Cited

U.S. PATENT DOCUMENTS

| 7,113,859 B2 * | 9/2006 | Hellmann et al. | 701/93 |
| 2008/0306668 A1 * | 12/2008 | Wang et al. | 701/93 |
| 2009/0178869 A1 * | 7/2009 | Doll et al. | 180/170 |

\* cited by examiner

*Primary Examiner* — Thomas Black
*Assistant Examiner* — Luke Huynh

(57) ABSTRACT

A cruise control system comprises a passing detection module and a speed regulator module. The passing detection module selectively detects execution of a passing maneuver based on an accelerator pedal position (APP) measured by an APP sensor and actuation of a Set/Coast input to the cruise control system when a vehicle speed is greater than a target speed. The speed regulator module regulates the vehicle speed based on the target speed and updates the target speed to the vehicle speed when the passing maneuver is detected.

14 Claims, 5 Drawing Sheets

CRUISE CONTROL SYSTEMS AND METHODS WITH SELECTIVE TARGET SPEED UPDATING FOR PASSING MANEUVERS

FIELD

The present invention relates to vehicle systems and more particularly to cruise control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine combusts an air/fuel mixture to produce drive torque for a vehicle. An engine control system controls the engine torque output based on driver inputs. In this manner, the driver controls the engine torque output and vehicle speed. A cruise control system regulates the vehicle speed at a target speed set by the driver.

The driver controls the target speed and the cruise control system using various pedals and hand controls. The pedals may include, for example, an accelerator pedal, a brake pedal, and/or a clutch pedal. For example only, the driver may depress the accelerator pedal and set the target speed to a vehicle speed when a desired vehicle speed is reached. The driver may discontinue regulation of the vehicle speed at the target speed by actuating the brake pedal or the clutch pedal.

The driver also inputs commands for the cruise control system using the hand controls. To simply the interface with the cruise control system and reduce the number of hand control interfaces necessary to operate the cruise control system, more than one function may be input using one hand controlled input. In other words, one hand controlled input may be used to perform more than one cruise control function.

The hand control inputs include an ON/OFF input, a SET/COAST input, and a RESUME/ACCELERATE input. The driver actuates the ON/OFF input to enable and disable/deactivate the cruise control system. The driver actuates the SET/COAST input to activate the cruise control system and set the target speed to the vehicle speed. The driver holds the SET/COAST input for at least a predetermined period of time to coast and decelerate the vehicle. The target speed is updated to the slower vehicle speed when the driver releases the SET/COAST input.

The driver actuates the RESUME/ACCELERATE input to resume regulation of the vehicle speed at the target speed. The driver holds the RESUME/ACCELERATE input to accelerate the vehicle. The target speed is updated to the increased vehicle speed when the driver releases the RESUME/ACCELERATE input.

The driver briefly actuates (e.g., taps) the SET/COAST input or the RESUME/ACCELERATE input to incrementally decrease or increase the target speed, respectively. The driver's input to incrementally increase or decrease the target speed is referred to as a tap-up or a tap-down, respectively. The cruise control system generally decrements the target speed when the driver taps-down. However, the target speed may be updated to the vehicle speed when the driver taps-down while the vehicle speed is at least a predetermined speed (e.g., 5 miles per hour) greater than the target speed.

SUMMARY

A cruise control system comprises a passing detection module and a speed regulator module. The passing detection module selectively detects execution of a passing maneuver based on an accelerator pedal position (APP) measured by an APP sensor and actuation of a Set/Coast input to the cruise control system when a vehicle speed is greater than a target speed. The speed regulator module regulates the vehicle speed based on the target speed and updates the target speed to the vehicle speed when the passing maneuver is detected.

In other features, the passing detection module selectively detects the passing maneuver when the APP is one of greater than or less than a predetermined steady state position.

In still other features, the passing detection module selectively detects the passing maneuver when an accelerator pedal is actuated while the vehicle speed is greater than the target speed.

In further features, the passing detection module selectively detects the passing maneuver when the Set/Coast input is actuated within a predetermined passing period after an event. The event occurs when the accelerator pedal is actuated while the vehicle speed is greater than the target speed.

In still further features, the passing detection module selectively detects the passing maneuver when the Set/Coast input is actuated, an accelerator pedal is actuated, and the vehicle speed is greater than the target speed.

In other features, the passing detection module selectively detects the passing maneuver when the Set/Coast input is actuated for less than a predetermined period.

In still other features, the passing detection module selectively detects the passing maneuver when the Set/Coast input is actuated and released within a predetermined period.

In further features, the passing detection module selectively detects the passing maneuver when the Set/Coast input is actuated within a predetermined passing period after an event. The event occurs when the accelerator pedal is actuated while the vehicle speed is greater than the target speed.

In still further features, the passing detection module selectively detects the passing maneuver when the Set/Coast input is actuated and released within a predetermined passing period after an event. The event occurs when the accelerator pedal is actuated while the vehicle speed is greater than the target speed.

A method comprises regulating a vehicle speed based on a target speed; selectively detecting execution of a passing maneuver of a vehicle based on an accelerator pedal position (APP) measured by an APP sensor and actuation of a Set/Coast input to a cruise control system when the vehicle speed is greater than the target speed; and updating the target speed to the vehicle speed when the passing maneuver is detected.

In other features, the method further comprises selectively detecting the passing maneuver when the APP is one of greater than or less than a predetermined steady state position.

In still other features, the method further comprises selectively detecting the passing maneuver when an accelerator pedal is actuated while the vehicle speed is greater than the target speed.

In further features, the method further comprises selectively detecting the passing maneuver when the Set/Coast input is actuated within a predetermined passing period after an event. The event occurs when the accelerator pedal is actuated while the vehicle speed is greater than the target speed.

In still further features, the method further comprises selectively detecting the passing maneuver when the Set/Coast input is actuated, an accelerator pedal is actuated, and the vehicle speed is greater than the target speed.

In other features, the method further comprises selectively detecting the passing maneuver when the Set/Coast input is actuated for less than a predetermined period.

In still other features, the method further comprises selectively detecting the passing maneuver when the Set/Coast input is actuated and released within a predetermined period.

In further features, the method further comprises selectively detecting the passing maneuver when the Set/Coast input is actuated within a predetermined passing period after an event. The event occurs when the accelerator pedal is actuated while the vehicle speed is greater than the target speed.

In still further features, the method further comprises selectively detecting the passing maneuver when the Set/Coast input is actuated and released within a predetermined passing period after an event. The event occurs when the accelerator pedal is actuated while the vehicle speed is greater than the target speed.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
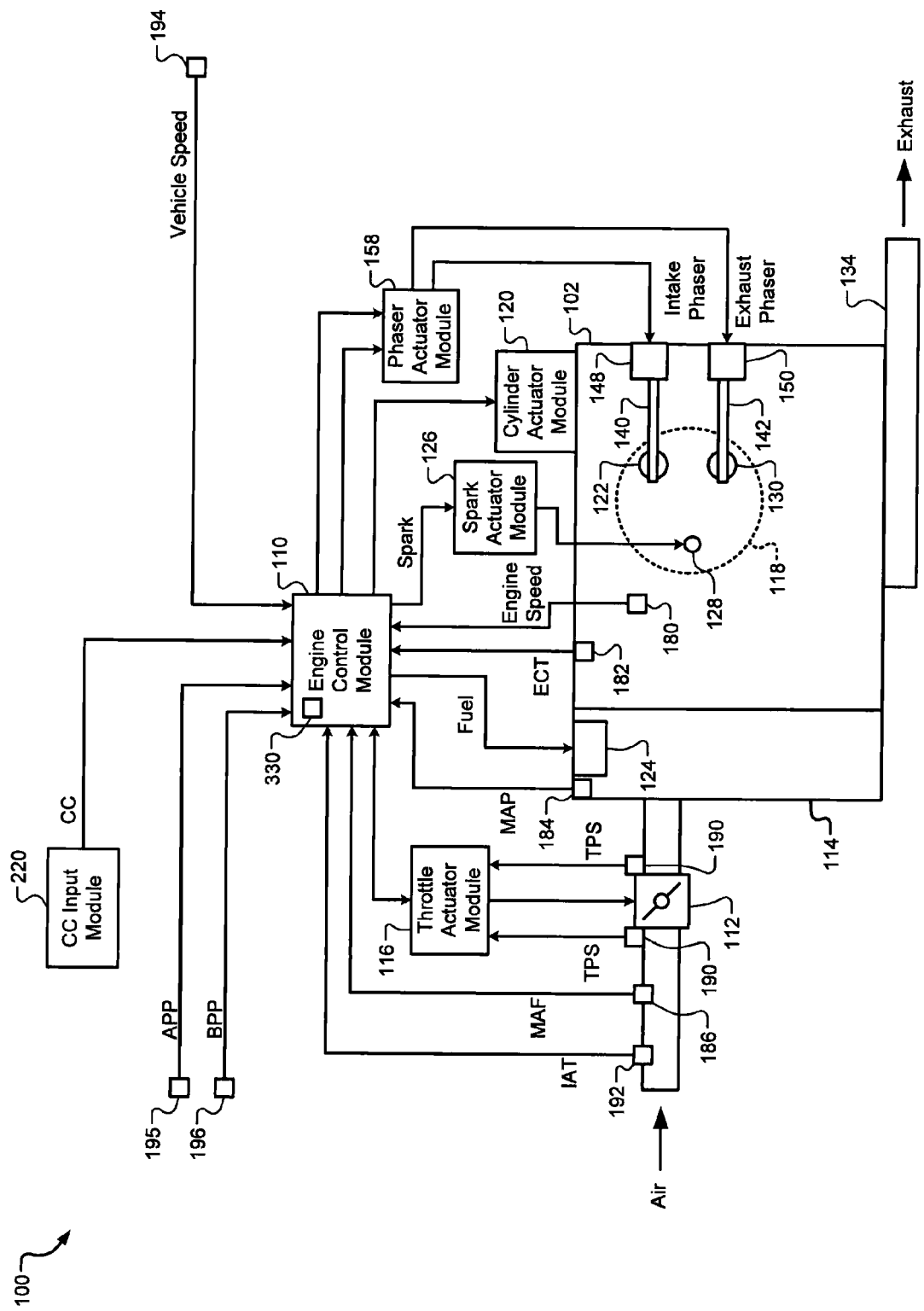
FIG. 1 is a functional block diagram of an exemplary engine system.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A cruise control system of a vehicle regulates a vehicle speed at a target speed with little or no driver input despite changing conditions. In some circumstances, however, the vehicle speed may exceed the target speed. For example, the vehicle speed may exceed the target speed when the vehicle travels downhill or when the driver actuates an accelerator pedal to override the cruise control system.

The cruise control system of the present disclosure selectively detects execution of a passing maneuver based on an accelerator pedal position (APP) and actuation of a Set/Coast input to the cruise control system when a vehicle speed is greater than a target speed. The cruise control system updates the target speed to the vehicle speed when the passing maneuver is detected.

Referring now to FIG. 1, a functional block diagram of an engine system 100 according to the principles of the present disclosure. The engine system 100 includes an engine 102 that combusts an air-fuel mixture to produce drive torque for a vehicle. Air is drawn into an intake manifold 114 through a throttle valve 112. An engine control module (ECM) 110 commands a throttle actuator module 116 to regulate opening of the throttle valve 112 to control the amount of air drawn into the intake manifold 114.

Air from the intake manifold 114 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 110 may instruct a cylinder actuator module 120 to selectively deactivate some of the cylinders to improve fuel economy.

Air from the intake manifold 114 is drawn into the cylinder 118 through an intake valve 122. The ECM 110 controls the amount of fuel injected by a fuel injection system 124. The fuel injection system 124 may inject fuel into the intake manifold 114 at a central location or may inject fuel into the intake manifold 114 at multiple locations, such as near the intake valve of each of the cylinders. Alternatively, the fuel injection system 124 may inject fuel directly into the cylinders.

The injected fuel mixes with the air and creates the air-fuel mixture in the cylinder 118. A piston (not shown) within the cylinder 118 compresses the air-fuel mixture. Based upon a signal from the ECM 110, a spark actuator module 126 energizes a spark plug 128 in the cylinder 118, which ignites the air-fuel mixture. The timing of the spark may be specified relative to the time when the piston is at its topmost position, referred to as to top dead center (TDC), the point at which the air-fuel mixture is most compressed.

The combustion of the air-fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate cylinders by disabling fuel and spark delivery and/or disabling the exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 110.

An engine speed sensor 180 measures engine speed in revolutions per second (RPM) based on rotation of the crankshaft. The temperature of the engine coolant may be measured using an engine coolant temperature (ECT) sensor 182. The pressure within the intake manifold 114 may be measured using a manifold absolute pressure (MAP) sensor 184. In various implementations, engine vacuum may be measured. Engine vacuum is the difference between ambient air pressure and the pressure within the intake manifold 114.

The mass of air flowing into the intake manifold 114 may be measured using a mass airflow sensor (MAF) 186. In various implementations, the MAF sensor 186 may be located in a housing with the throttle valve 112. The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. A vehicle speed sensor 194 measures vehicle speed. For example only, the vehicle speed may be measured based on speed of one or more wheels of the vehicle, the engine speed, transmission output speed, or another suitable measure of vehicle speed. The ECM 110 may use signals from the sensors to make control decisions for the engine system 100.

The ECM 110 regulates the engine torque output based on various torque requests and measured parameters. For example only, the ECM 110 regulates the engine torque output based on torque requested by a driver. The driver requests torque via actuation of an accelerator pedal (not shown). An accelerator pedal position (APP) sensor 195 measures the APP and provides the APP to the ECM 110. Similarly, the driver actuates a brake pedal (not shown) to request a decrease in the engine torque output and perform vehicle braking. A brake pedal position (BPP) sensor 196 measures the BPP and provides the BPP to the ECM 110.

Various vehicle systems may also generate torque requests. For example, a cruise control (CC) system may generate torque requests when the driver activates the CC system. The driver inputs CC inputs via a CC input module 220 (See FIG. 2). For example only, the CC inputs may include On, Off, Set, Coast, Resume, and Accelerate commands.

The driver inputs the On and Off commands to enable and disable/deactivate the CC system, respectively. The driver inputs the Set command to set a target speed at the current vehicle speed. When the driver sets the target speed, the ECM 110 regulates the engine 102 and/or other vehicle systems to maintain the vehicle speed at approximately the target speed. The driver inputs the Coast command to allow the vehicle to decrease speed from the current vehicle speed and/or target speed. The driver inputs the Resume command to resume regulation of the vehicle speed at the target speed. The driver inputs the Accelerate command to accelerate the vehicle and increase the target speed.

Figure 2:
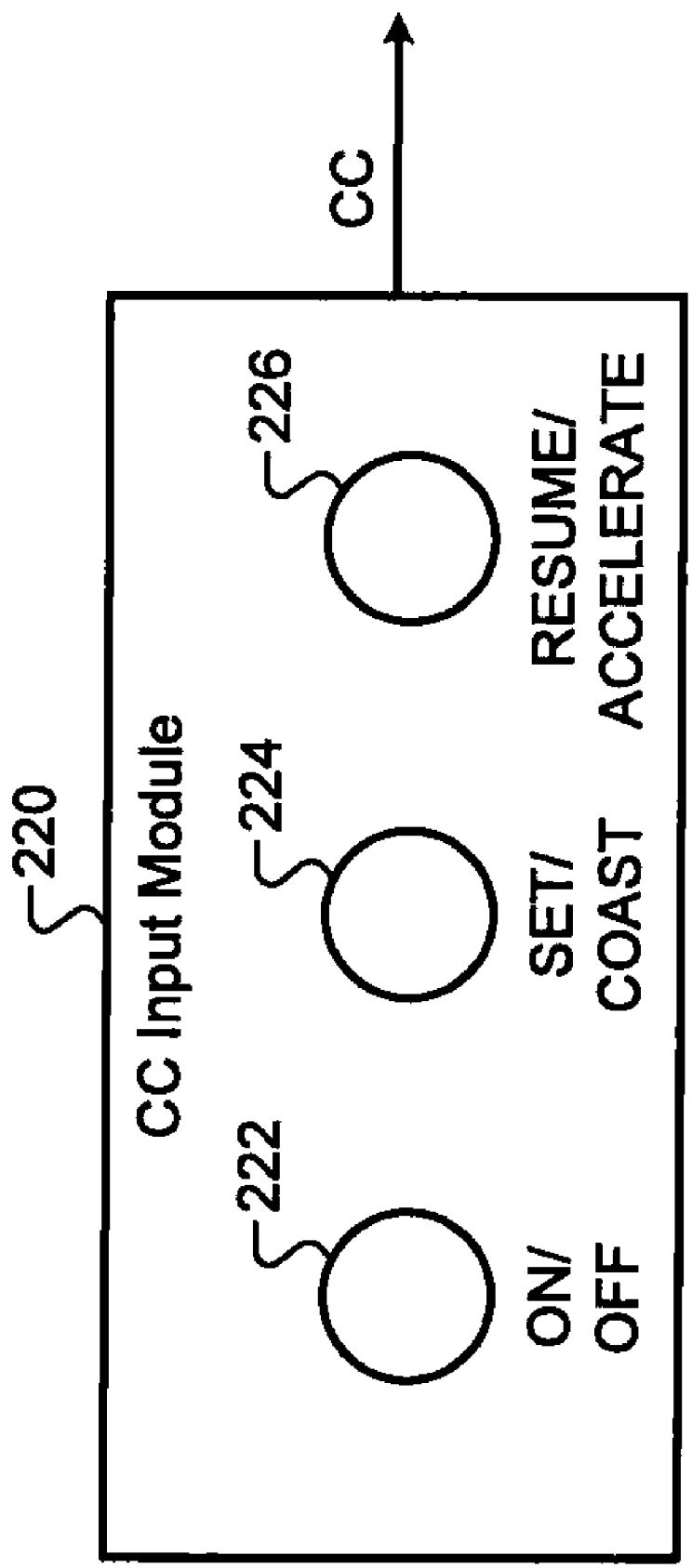
FIG. 2 is a functional block diagram of an exemplary cruise control input module.

Referring now to FIG. 2, a functional block diagram of an exemplary implementation of the CC input module 220. The CC input module 220 includes an ON/OFF input 222, a SET/COAST input 224, and a RESUME/ACCELERATE input 226. The inputs 222-226 may include switches, buttons, sliders, or other suitable input devices.

In one implementation, the inputs 222-226 each output a signal that is either HIGH (e.g., approximately 0.0 V or digital 0) or LOW (e.g., approximately 5.0 V or digital 1). For example only, the ON/OFF input 222 outputs LOW when the CC system is deactivated (i.e. OFF) and outputs HIGH when the CC system is enabled (i.e., ON). The ON/OFF input 222 may output LOW and HIGH when the ON/OFF input 222 is in an OFF position and an ON position, respectively.

In one implementation, the SET/COAST and RESUME/ACCELERATE inputs 224 and 226 default to outputting LOW and output HIGH when the driver actuates the input 224 or 226. The driver briefly actuates (e.g., a tap) the SET/COAST input 224 or the RESUME/ACCELERATE input 226 to decrement or increment the target speed by a predetermined speed, respectively. In other words, the driver actuates and releases the SET/COAST input 224 or the RESUME/ACCELERATE input 226 for less than a predetermined period to decrement or increment the target speed, respectively. The driver's input to increment or decrement the target speed is referred to as a tap-up or a tap-down, respectively. For example only, the predetermined speed may be 1 mile per hour (mph).

The driver actuates the SET/COAST input 224 or the RESUME/ACCELERATE input 226 while the CC system is enabled but inactive (i.e., not regulating the vehicle speed) to input the Set or Resume command, respectively. The driver actuates the SET/COAST input 224 or the RESUME/ACCELERATE input 226 for less than the predetermined period while the CC system is enabled and active (i.e., regulating the vehicle speed) to input the Tap-down or Tap-up command, respectively. For example only, the predetermined period may be approximately 0.5 seconds. The driver actuates the SET/COAST input 224 or the RESUME/ACCELERATE input 226 for greater than the predetermined period to input the COAST or Accelerate command, respectively.

Referring again to FIG. 1, the ECM 110 controls the torque output of the engine 102. The ECM 110 also controls the vehicle speed based on the driver inputs. For example only, the ECM 110 regulates the engine torque output to maintain the vehicle speed at approximately the target speed when the driver sets the target speed while the CC system is active.

The ECM 110 also disables regulation of the vehicle speed at the target speed when the driver actuates the brake pedal as indicated by the BPP. The ECM 110 may also disable regulation of the vehicle speed when the driver actuates a clutch pedal (not shown). The ECM 110 resumes regulation of the vehicle speed at the target speed when the driver inputs the Resume command. The ECM 110 increases the vehicle speed when the driver taps-up or inputs the Accelerate command and decreases the vehicle speed when the driver taps-down or inputs the Coast command.

Under some circumstances, the vehicle speed may exceed the target speed. For example only, the vehicle speed may exceed the target speed during downhill travel and passing maneuvers. When the vehicle is traveling downhill, gravitational forces cause the vehicle to accelerate and cause the vehicle speed to exceed the target speed. During a passing maneuver, the driver actuates the accelerator pedal, overriding the target speed, and increasing the vehicle speed above the target speed.

While the vehicle speed is greater than the target speed, however, the driver may tap-down. The ECM 110 according to the present application includes a CC module 330 that determines whether the driver executed a passing maneuver. The CC module 330 selectively updates the target speed when a passing maneuver is detected. While the CC module 330 is shown and described as being located within the ECM 110, the CC module 330 may be located in other suitable locations, such as external to the ECM 110.

Figure 3:
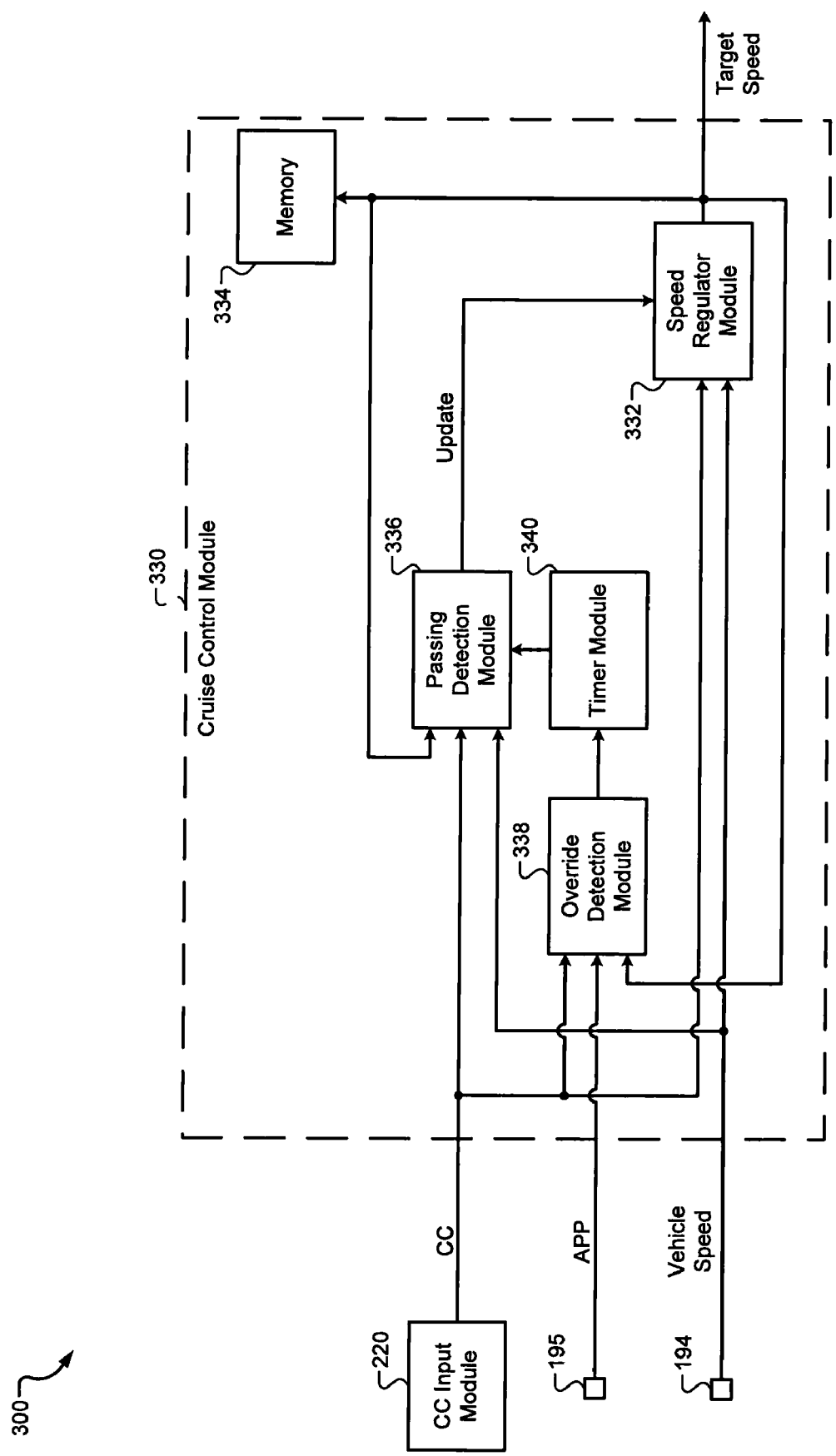
FIG. 3 is a functional block diagram of an exemplary cruise control system.

Referring now to FIG. 3, a functional block diagram of an exemplary implementation of a CC system 300 is presented. The CC module 330 includes a speed regulator module 332, memory 334, and a passing detection module 336. The CC module 330 also includes an override detection module 338 and a timer module 340.

The speed regulator module 332 regulates the target speed that is provided to the ECM 110 for regulation of the vehicle speed and the engine torque output. Generally, the speed regulator module 332 sets the target speed equal to the vehicle speed when the driver inputs the Set command while the CC system is inactive (i.e., not regulating the vehicle speed) but is enabled (i.e., ON).

The speed regulator module 332 stores the target speed in a predetermined location and outputs the target speed to the ECM 110. The predetermined location may include the memory 334 and/or another suitable location. The speed regulator module 332 may output the target speed at a predetermined rate, such as approximately once every 100 ms.

The ECM 110 regulates various vehicle parameters to maintain the vehicle speed at approximately the target speed. For example only, the ECM 110 may adjust the opening of the throttle valve 112, the spark timing, the amount of fuel injected, opening of the intake and/or exhaust valves 122 and 130, and/or other engine actuators. In some circumstances, the ECM 110 may apply braking torque to slow the vehicle.

The passing detection module 336 detects execution of a passing maneuver based on the driver inputs while the CC system 300 is active and enabled. More specifically, the passing detection module 336 detects execution of a passing maneuver based on the driver inputs to the CC input module 220, the APP, the vehicle speed, and the target speed.

The override detection module 338 detects driver overrides of the target speed. The override detection module 338 monitors the vehicle speed and the target speed. When the vehicle speed exceeds the target speed, the override detection module 338 monitors the APP. The override detection module 338 detects a driver override of the target speed when the driver actuates the accelerator pedal to cause the vehicle speed to exceed the target speed. For example only, the accelerator pedal is actuated when the APP is depressed from a predetermined steady-state position, the position at which the accelerator pedal remains when there is no driver actuation.

The override detection module 338 starts a timer when the driver override of the target speed is detected. In this manner, the override detection module 338 starts the timer when the driver actuates the accelerator pedal and causes the vehicle speed to exceed the target speed. In one implementation, the timer may be set to a predetermined initialization value (e.g., approximately 3.0 seconds) before the override detection module 338 starts the timer (decrementing). In another implementation, the timer may be reset to a predetermined reset value (e.g., zero) before the override detection module 338 starts the timer (incrementing). The timer may be implemented in, for example, the timer module 340.

The passing detection module 336 monitors the timer and the driver inputs to the CC input module 220. In an implementation where the timer is decremented from the predetermined initialization value, the passing detection module 336 selectively detects the execution of a passing maneuver when the driver taps-down before the timer reaches zero. In an implementation where the timer is incremented from the predetermined reset value, the passing detection module 336 selectively detects the execution of a passing maneuver when the driver taps-down before the timer exceeds a predetermined passing period (e.g., approximately 3.0 seconds).

The passing detection module 336 may also verify that the vehicle speed is greater than the target speed before deeming the occurrence of a passing maneuver. For example only, the passing detection module 336 may verify that the vehicle speed is greater than a sum of the target speed and a first predetermined speed before diagnosing a passing maneuver when the timer has reached zero when the driver tapped-down. When the timer has not yet reached zero when the driver tapped-down, the passing detection module 336 may verify that the vehicle speed is greater than a sum of the target speed and a second predetermined speed before diagnosing the execution of a passing maneuver. In this manner, the CC module 330 detects a passing maneuver when the driver taps-down within the predetermined passing period after overriding the target speed via actuation of the accelerator pedal.

The passing detection module 336 outputs an update signal when a passing maneuver is detected. The speed regulator module 332 updates the target speed to the vehicle speed when the update signal is received. In this manner, the CC module 330 updates the target speed to the vehicle speed when the passing maneuver is detected.

Figure 4A:
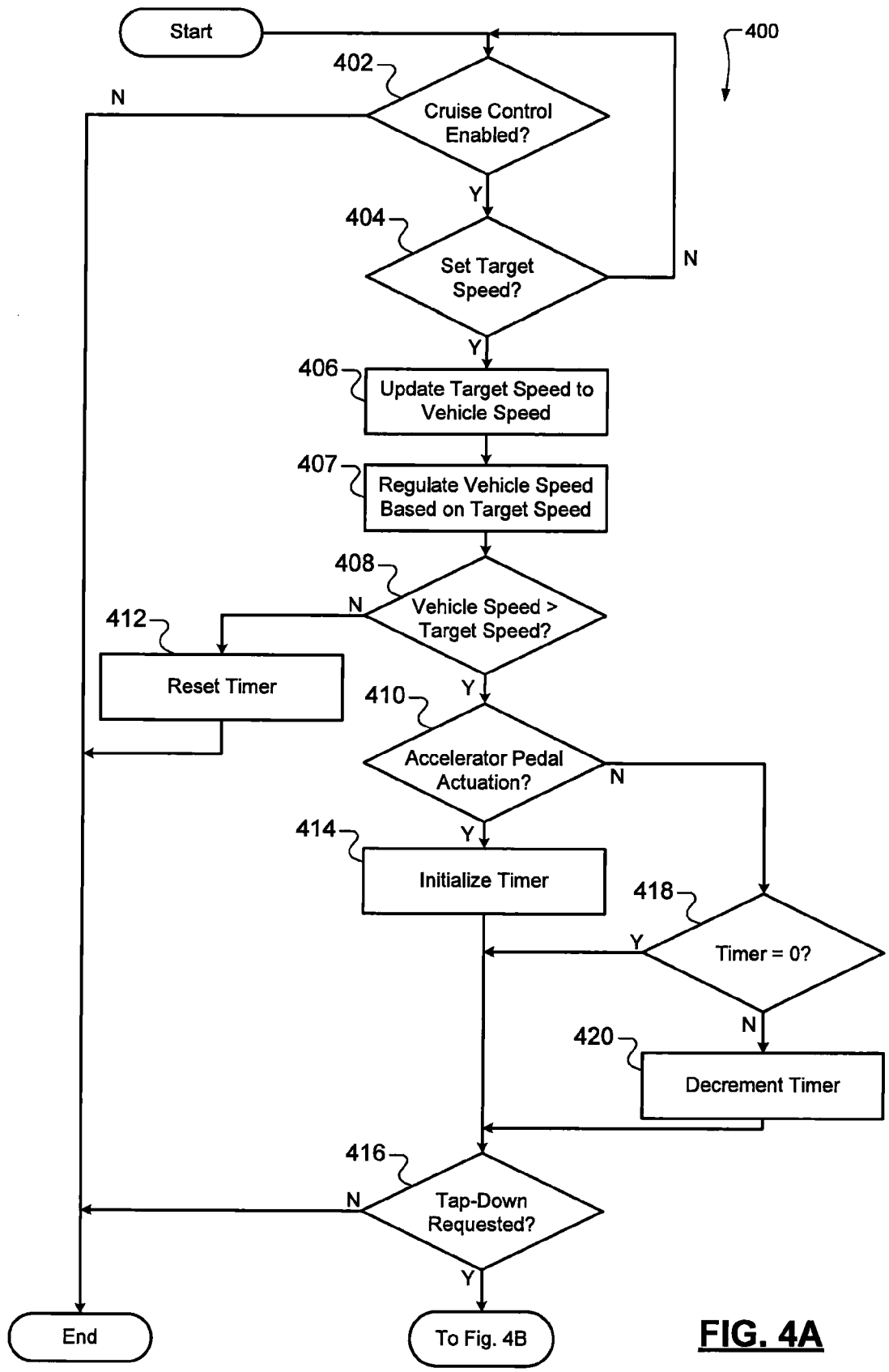
FIG. 4A-4B is a flowchart depicting an exemplary method performed by the cruise control system.
Figure 4B:
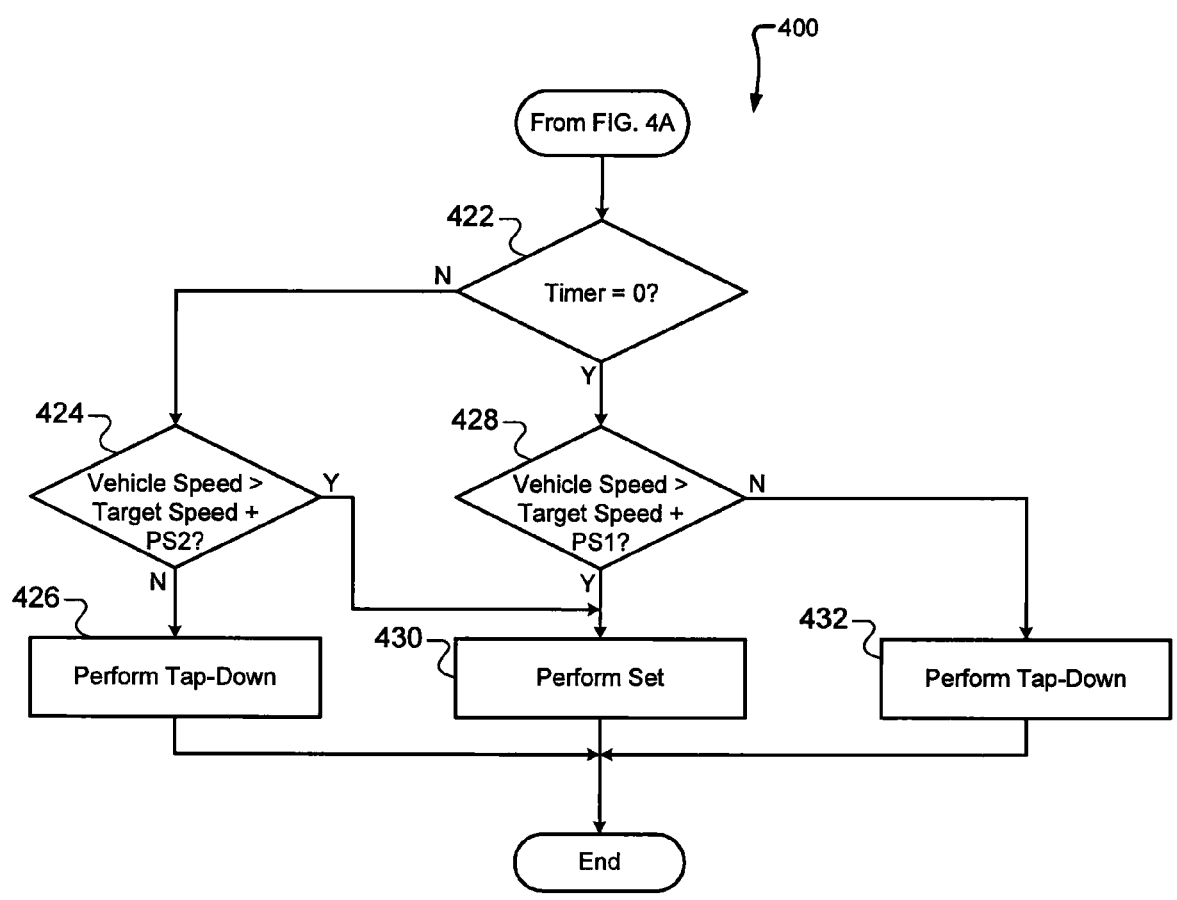

Referring now to FIGS. 4A-4B, a flowchart depicting an exemplary method 400 performed by the CC system 300 is presented. The method 400 begins in step 402 where the method 400 determines whether the CC system 300 is enabled. If true, the method 400 continues to step 404; if false, the method 400 ends. The method 400 may determine whether the CC system is enabled based on, for example, based on the output of the ON/OFF input 222.

The method 400 determines whether to set the target speed in step 404. If true, the method 400 continues to step 406; if false, the method 400 returns to step 402. In other words, the method 400 determines whether to update the target speed to the vehicle speed in step 404. The method 400 may determine whether to set the target speed based on the output of the SET/COAST input 224. The method 400 updates the target speed to the vehicle speed in step 406. The method 400 regulates the vehicle speed based on the target speed in step 407. In this manner, the method 400 regulates the vehicle speed based on the target speed once the driver sets the target speed.

The method 400 determines whether the vehicle speed is greater than the target speed in step 408. If true, the method 400 continues to step 410; if false, the method 400 resets (i.e., clears) the timer in step 412 and the method 400 ends. The method 400 determines whether the accelerator pedal has been or is being actuated in step 410. If true, the method 414 initializes the timer (i.e., sets the timer to the predetermined initialization value) in step 414 and proceeds to step 416; if false, the method 400 transfers to step 418. The method 400 may keep initializing the timer while the driver continues actuation of the accelerator pedal.

In step 418, the method 400 determines whether the timer is equal to zero. If true, the method 400 transfers to step 416; if false, the method 400 decrements the timer in step 420 and continues to step 416. In step 416, the method 400 determines whether the driver has requested a tap-down. If true, the method 400 continues to step 422 of FIG. 4B; if false, the method 400 ends.

Referring now to FIG. 4B, the method 400 determines whether the timer is equal to zero in step 422. If false, the method 400 continues to step 424; if true, the method 400 transfers to step 428. The method 400 determines whether the vehicle speed is greater than the sum of the target speed and the second predetermined speed (PS2) in step 424. If false, the method 400 performs a tap-down in step 426 and the method 400 ends. If true, the method transfers to step 430, as discussed further below. In other words, the method 400 decrements the target speed by the predetermined speed in step 426.

The method 400 determines whether the vehicle speed is greater than the sum of the target speed and the first predetermined speed (PS1) in step 428. If true, the method 400 continues to step 430; if false, the method transfers to step 432. The method 400 performs the Set operation in step 430. In other words, the method 400 updates the target speed to the vehicle speed in step 430. In step 432, the method 400 performs a tap-down operation. In other words, the method 400 decrements the target speed by the predetermined speed in step 432. The method 400 ends after step 430 or step 432 is performed.

Those skilled in the art can now appreciate from the foregoing description that the broad teachings of the disclosure may be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A cruise control system comprising:
   a speed regulator module that regulates a vehicle speed based on a target speed;
   a passing detection module that:
      in response to a first determination that said vehicle speed is greater than said target speed, indicates whether a passing maneuver is being executed based on an accelerator pedal position (APP) measured by an APP sensor and actuation of a Set/Coast input to the cruise control system; and
      selectively indicates that said passing maneuver is being executed in response to said first determination and a second determination that said APP is one of greater than or less than a predetermined steady state position,
   wherein said speed regulator module updates said target speed to said vehicle speed in response to an indication that said passing maneuver is being executed.

2. The cruise control system of claim 1 wherein said passing detection module selectively indicates that said passing maneuver is being executed when said Set/Coast input is actuated within a predetermined passing period after an event, and
   wherein said event occurs when said APP is one of greater than or less than said predetermined steady state position while said vehicle speed is greater than said target speed.

3. The cruise control system of claim 1 wherein said passing detection module selectively indicates that said passing maneuver is being executed when said Set/Coast input is actuated, said APP is one of greater than or less than said predetermined steady state position, and said vehicle speed is greater than said target speed.

4. The cruise control system of claim 3 wherein said passing detection module selectively indicates that said passing maneuver is being executed when said Set/Coast input is actuated for less than a predetermined period.

5. The cruise control system of claim 3 wherein said passing detection module selectively indicates that said passing maneuver is being executed when said Set/Coast input is actuated and released within a predetermined period.

6. The cruise control system of claim 3 wherein said passing detection module selectively indicates that said passing maneuver is being executed when said Set/Coast input is actuated within a predetermined passing period after an event, and
   wherein said event occurs when said APP is one of greater than or less than said predetermined steady state position while said vehicle speed is greater than said target speed.

7. The cruise control system of claim 3 wherein said passing detection module selectively indicates that said passing maneuver is being executed when said Set/Coast input is actuated and released within a predetermined passing period after an event, and
   wherein said event occurs when said APP is one of greater than or less than said predetermined steady state position while said vehicle speed is greater than said target speed.

8. A method comprising:
   regulating a vehicle speed based on a target speed;
   in response to a first determination that said vehicle speed is greater than said target speed, selectively indicating that a passing maneuver is being executed based on an accelerator pedal position (APP) measured by an APP sensor and actuation of a Set/Coast input to a cruise control system; and
   selectively indicating that said passing maneuver is being executed in response to said first determination and a second determination that said APP is one of greater than or less than a predetermined steady state position; and
   updating said target speed to said vehicle speed in response to an indication that said passing maneuver is being executed.

9. The method of claim 8 further comprising selectively indicating that said passing maneuver is being executed when said Set/Coast input is actuated within a predetermined passing period after an event,
   wherein said event occurs when said APP is one of greater than or less than said predetermined steady state position while said vehicle speed is greater than said target speed.

10. The method of claim 8 further comprising selectively indicating that said passing maneuver is being executed when said Set/Coast input is actuated, said APP is one of greater than or less than said predetermined steady state position, and said vehicle speed is greater than said target speed.

11. The method of claim 10 further comprising selectively indicating that said passing maneuver is being executed when said Set/Coast input is actuated for less than a predetermined period.

12. The method of claim 10 further comprising selectively indicating that said passing maneuver is being executed when said Set/Coast input is actuated and released within a predetermined period.

13. The method of claim 10 further comprising selectively indicating that said passing maneuver is being executed when said Set/Coast input is actuated within a predetermined passing period after an event,
   wherein said event occurs when said APP is one of greater than or less than said predetermined steady state position while said vehicle speed is greater than said target speed.

14. The method of claim 10 further comprising selectively indicating that said passing maneuver is being executed when said Set/Coast input is actuated and released within a predetermined passing period after an event, and
   wherein said event occurs when said APP is one of greater than or less than said predetermined steady state position while said vehicle speed is greater than said target speed.

* * * * *